US008627851B2

(12) United States Patent
Tower et al.

(10) Patent No.: US 8,627,851 B2
(45) Date of Patent: Jan. 14, 2014

(54) REBUILDABLE MICRO-FLUIDIC VALVE ASSEMBLY

(75) Inventors: Christopher R. Tower, Rohnert Park, CA (US); Mark J. Green, Sebastopol, CA (US)

(73) Assignee: Idex Health & Science LLC, Northbrook, IL (US)

( * ) Notice: Subject to any disclaimer, the term of this patent is extended or adjusted under 35 U.S.C. 154(b) by 589 days.

(21) Appl. No.: 12/815,265

(22) Filed: Jun. 14, 2010

(65) Prior Publication Data

US 2011/0303304 A1 Dec. 15, 2011

(51) Int. Cl.
*F16K 11/074* (2006.01)
(52) U.S. Cl.
USPC ............ 137/625.46; 137/315.09; 137/315.17; 251/180
(58) Field of Classification Search
USPC .......... 137/625.41, 625.46, 269–271, 315.01, 137/315.09, 315.17, 524; 251/336, 129.18, 251/180
See application file for complete search history.

(56) References Cited

U.S. PATENT DOCUMENTS

| | | | | |
|---|---|---|---|---|
| 3,990,476 | A * | 11/1976 | Young et al. | 137/625.46 |
| 4,444,066 | A * | 4/1984 | Ogle et al. | 73/863.72 |
| 4,476,731 | A * | 10/1984 | Charney et al. | 73/863.73 |
| 4,846,098 | A | 7/1989 | Kobayashi et al. | |
| 5,056,550 | A * | 10/1991 | Mooney | 137/270 |
| 5,513,832 | A * | 5/1996 | Becker et al. | 251/129.18 |
| 6,029,703 | A * | 2/2000 | Erickson et al. | 137/625.61 |
| 6,267,143 | B1 | 7/2001 | Schick | |
| 7,308,908 | B2 | 12/2007 | Keene et al. | |
| 8,322,374 | B2 * | 12/2012 | Tomita | 137/625.46 |
| 2005/0011554 | A1 * | 1/2005 | Davila et al. | 137/269 |
| 2006/0042686 | A1 * | 3/2006 | Gamache et al. | 137/51 |
| 2009/0301584 | A1 * | 12/2009 | Mckee | 137/541 |

FOREIGN PATENT DOCUMENTS

WO WO 2009078450 A1 * 6/2009

OTHER PUBLICATIONS

C. Poppe, engineering drawing of "Conventional Rheodyne 2 Position Valve", Jul. 3, 1998.

* cited by examiner

*Primary Examiner* — John K Fristoe, Jr.
*Assistant Examiner* — David Colon Morales
(74) *Attorney, Agent, or Firm* — Beyer Law Group LLP

(57) ABSTRACT

A multi-position valve assembly including a valve housing, a stator element and a rotor element rotatably mounted about a rotational axis. The valve assembly further includes a pressure adjustment assembly movable between a release position and a stop position, hard stopped relative to the valve housing. The pressure adjustment assembly includes a pressure adjuster device configured to movably cooperate between the rotor element and the valve housing to adjustably generate an axial compression pressure at the rotor-stator interface at a calibrated operating pressure, $P_C$. When the pressure adjustment assembly is oriented in the release position, the axial compression pressure is substantially removed from the rotor-stator interface. In contrast, when the pressure adjustment assembly is oriented in the stop position, the axial compression pressure is substantially reproduced at the calibrated operating pressure, $P_C$.

37 Claims, 11 Drawing Sheets

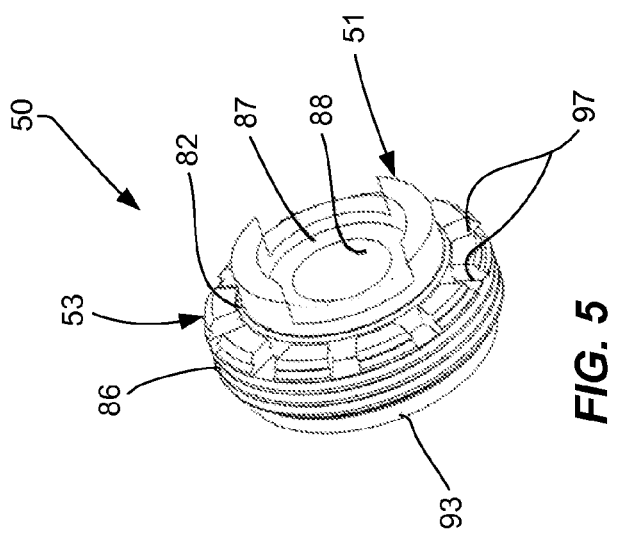
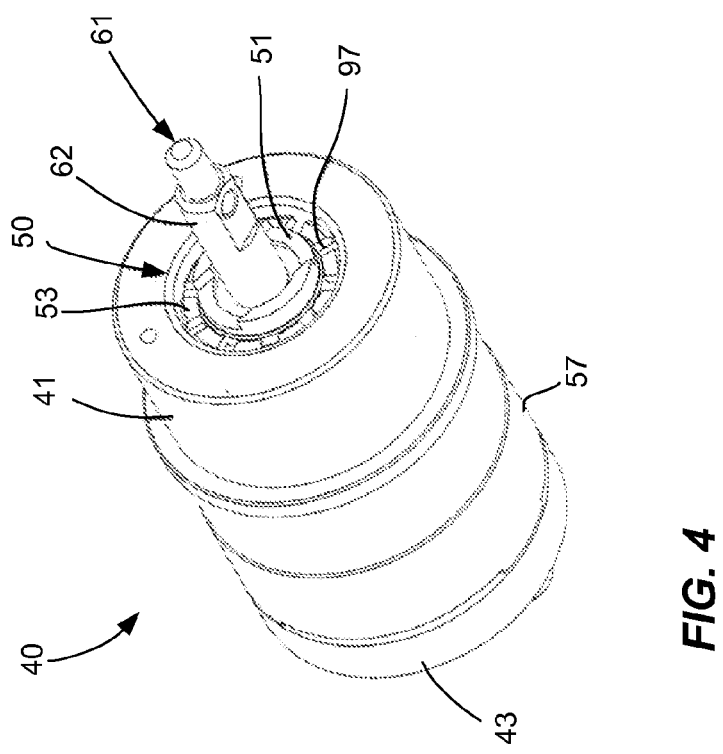
FIG. 5
FIG. 4

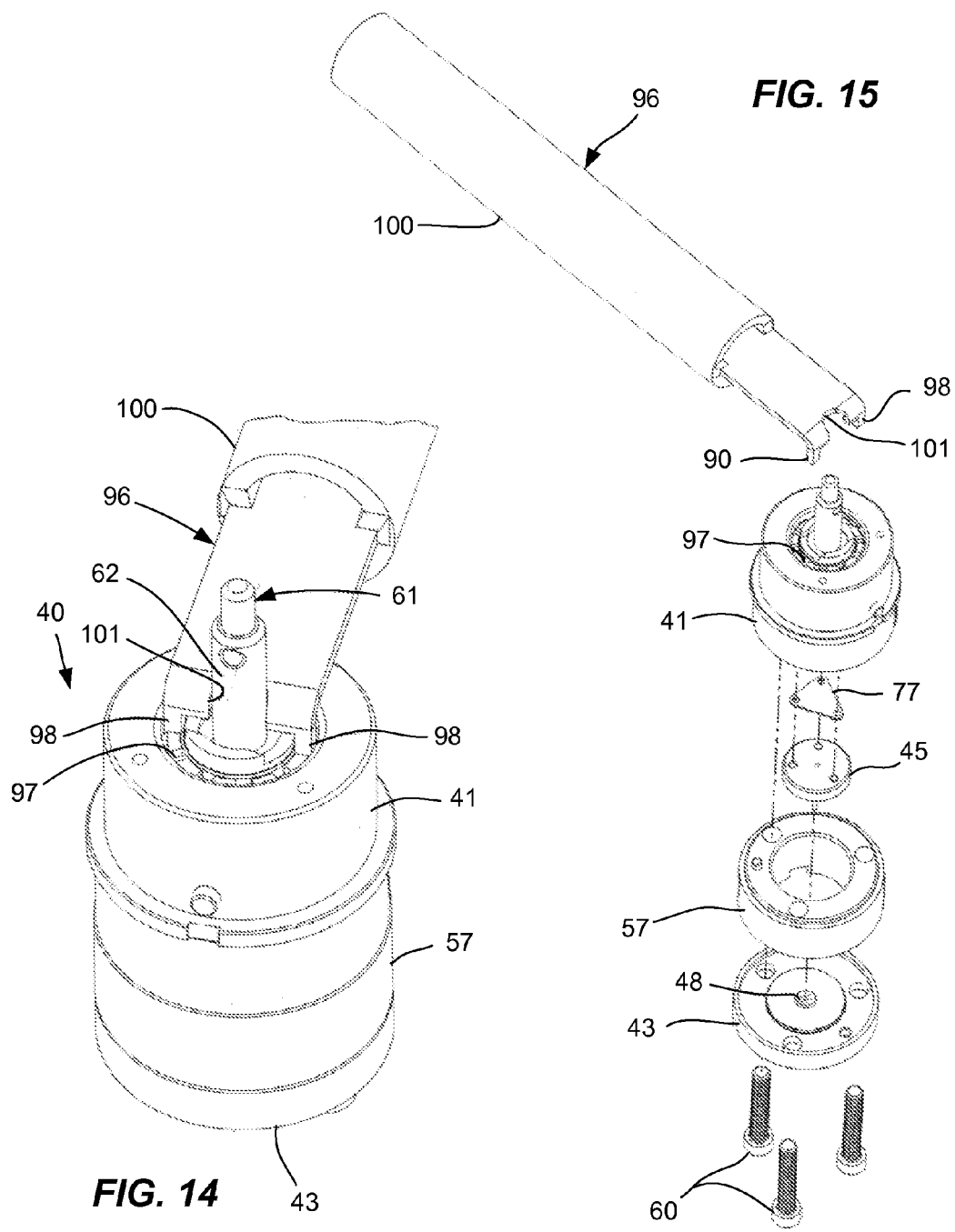

REBUILDABLE MICRO-FLUIDIC VALVE ASSEMBLY

FIELD OF THE INVENTION

The present invention relates to rotary shear valves, and more particularly, relates to rebuildable micro-fluidic shear valves that incorporate hard-on-hard sealing surfaces

BACKGROUND OF THE INVENTION

Current high pressure liquid chromatography shear valve systems typically employ a metallic stator element and a rotor device composed of a polymer material that forms fluid-tight seal at a rotor/stator interface therebetween. Depending upon the internal fluid pressures that these shear valve systems are designed to operate (typically 15 Kpsi or greater), as well as other environmental factors, these valves are typically capable of more than 15K, relatively maintenance free, cycles of use. Certain valve components, however, do wear over time such as the rotor seal and the stator seal. These valve components, fortunately, can be serviced or replaced, significantly extending the lifecycle of the valve.

Many multi-position, shear valve assemblies currently in use, including the next generation valve assembly 20 designs, shown in FIGS. 1-3, are typically rebuilt using the following technique. By simply removing the three socket head cap screws 21 that bolt the stator element 22 to the valve housing 25, the stator element 22 can be removed in order to access the rotor element 23. Using this technique, a service technician and/or end user can then easily replace both the rotor element and/or stator element. In this current valve configuration, loosening of the cap screws 21 is sufficient to simultaneously remove the sealing load (i.e., compression pressure) between the stator element 22 and the rotor element 23, at a rotor-stator interface, which is generated by a combination of a spring assembly 26 and a pressure adjuster nut 27 directly rotatably mounted to the valve housing 25.

Briefly, as shown in FIG. 2, as the pressure adjuster nut 27 is adjusted by rotating its head, relative to the valve housing 25, a distal portion of the pressure adjuster nut is axially advanced or retracted into contact with a proximal portion of the spring assembly 26. As the spring washers 28 of the spring assembly 26 are compressed, the generated compression force biases the rotor element into compressive contact with the stator element. When the valve is properly calibrated, via adjustment of the pressure adjusting nut 27, the rotor element 23 and the stator element 22 are sealed together at the interface in a fluid-tight manner to accommodate a selected fluid pressure flowing through the rotor channels and stator channels.

Accordingly, when the serviceable valve components are replaced, the stator screws 21 are reinserted and retightened. This requires tightening the stator screws 21 while simultaneously battling the compression force generated by the spring assembly 26 when the stator screws contact the stator element 22.

While this rebuild technique and valve design is satisfactory for the most part, several potential problems may be encountered during such field servicing unless the valve is field recalibrated; a procedure that significantly reduces an end users ability to self-rebuild the valve. For one, the pressure adjuster nut 27, at the proximal end of the shear valve assembly 20 could potentially be rotated, altering the factory "set" compression load. Furthermore, the end user may not properly tighten the stator screws 21 to the requisite torque requirements. In addition, since the stator element 22 is tightened against the rotor element 23, via the three stator screws 21, while a compression load is simultaneously generated at the rotor-stator interface via the spring assembly 26 and pressure adjuster nut 27, the stator element 22 may not properly seat flat and/or flush against a distal end edge of the stator ring 30. Due to any one of these variables, let alone in combination, the ability of the valve hold the required fluid pressure, at the interface, can greatly be affected.

Moreover, with the next generation ultra-high pressure, shear valve assemblies recently designed by Rheodyne (i.e., those capable of accommodating fluid pressures of 25 Kpsi or greater, and as shown in FIGS. 1-3), metallic stator elements and metallic rotor elements are applied, thus incorporating metal-on-metal sealing surfaces to improve durability and increase their lifecycle. With these metal-on-metal valves (disclosed in our U.S. Provisional Patent Application S/Ns: 61/225,143, filed Jul. 13, 2009, to Tower; 61/301,516, filed Feb. 4, 2010, to Tower; and 61/328,594, filed April, 2010, to Tower, all of which are entitled "ROTARY SHEAR VALVE ASSEMBLY WITH HARD-ON-HARD SEAL SURFACES", and all of which are incorporated by reference in their entirety), it has been observed that the proper amount of compression force being applied by the pressure adjuster nut is very critical. Another design challenge observed with these metal-on-metal sealing surfaces is that the perpendicularity (or flushness) of the stator element 22 to the rotor element 23 is also very important to maintain a fluid-tight sealing surface under high pressure fluid loads. Even slight surface variations on the order of only 0.005" can cause the shear valve to hold thousands of PSI less than when new or can cause premature valve failure.

Accordingly, the ability to reproduce the factory set compression pressure, as well as the ability to assure a substantially flat seat of the stator element 22 to the distal end edge of the stator ring 30, during a valve rebuild, is highly desirable.

SUMMARY OF THE INVENTION

The present invention provides a multi-position valve assembly including a valve housing, a stator element, defining a stator face, and a rotor element rotatably mounted about a rotational axis. The rotor element defines a rotor face disposed opposite the stator face, at a rotor-stator interface. The valve assembly further includes a pressure (or load) adjustment assembly movable between a release position and a stop position, hard stopped relative to the valve housing. The pressure adjustment assembly includes a pressure adjuster device configured to movably cooperate between the rotor element and the valve housing to adjustably generate an axial compression pressure between the stator face and the rotor face at a calibrated operating pressure, $P_C$. Such an operating pressure enables a fluid-tight, selective relative rotation between the rotor face and the stator face between two or more rotor positions when the pressure adjustment assembly is oriented in the stop position. When the pressure adjustment assembly is oriented in the release position, the axial compression pressure between the stator face and the rotor face is substantially removed from the rotor-stator interface. In contrast, when the pressure adjustment assembly is oriented in the stop position, the axial compression pressure between the stator face and the rotor face is substantially reproduced at the calibrated operating pressure, $P_C$.

Accordingly, by moving the pressure adjusting assembly to the release position, the compressive load generated thereby at the rotor-stator interface is removed. Therefore, when a valve is being rebuilt or serviced, this compression load may be removed prior to valve disassembly and component servicing, and as importantly, once serviced, the valve can be reassembled in a manner easily and precisely duplicating the factory "set" specifications with little or no field calibration. Effectively, after the serviceable valve components have been replaced, these high pressure micro-fluidic valve assemblies perform similar to new, factory built valves.

In one specific embodiment, the pressure adjustment assembly includes a retainer member movably disposed between the valve housing and the pressure adjuster device between the release position and the stop position. The adjustment assembly further includes a lock structure, configured to lock the pressure adjuster device relative to the retainer member when the pressure adjuster device is oriented in a "set position", such that the pressure adjuster device and the retainer member move together as a single unit. In this configuration, the compression pressure is readjusted substantially to the calibrated operating pressure, $P_C$, when the retainer member is in the stop position.

In another configuration, the lock structure includes a retaining compound configured to join the pressure adjuster device to the retainer member. The retaining compound is selected from the group consisting of thread lockers (E.g., LOCTITE®), acrylics, epoxies, hot melts. In still other configurations, mechanical type lock mechanisms are deployed such as O-rings or Nyloc style retaining mechanisms.

In yet another specific embodiment, the valve housing defines a through passage extending axially therethrough. A portion of the through passage is defined by a first engaging wall. The retainer member includes a second engaging wall sized and dimensioned to cooperate with the first engaging wall for axial displacement between the release position and the stop position. Similarly, the pressure adjuster device includes a first engaging section sized and dimensioned to cooperate with a second engaging section of the retainer member for relative axial displacement therebetween.

Still another configuration provides a valve assembly that includes a stop mechanism configured to limit relative axial displacement of the retainer member, in a distal axial direction, when oriented in the stop position. The stop mechanism includes an annular shoulder portion extending radially inwardly from the first engaging wall. The retainer member includes a stop surface configured to about the shoulder portion of the first engaging wall in the stop position.

In another arrangement, the retainer member includes an annular-shaped, proximal end that defines a plurality of paired recesses that enable engagement with a install/removal tool.

In another aspect of the present invention, a pressure adjustment assembly is provided for a high pressure, multi-position valve assembly. The pressure adjustment assembly includes a retainer member disposed in the housing through-passage, and movably mounted to the valve housing between a release position and a stop position, hard stopped axially along the through passage. A pressure adjuster device is configured to cooperate with the rotor element and the retainer member, when oriented in the stop position, to adjustably generate an axial compression pressure between the stator face and the rotor face at a calibrated operating pressure, $P_C$. At this calibrated pressure, a fluid-tight seal is formed at the rotor-stator interface to enable selective relative rotation between the rotor face and the stator face between two or more rotor positions. The pressure adjustment assembly further includes a lock structure that is configured to lock the pressure adjuster device relative to the retainer member when the pressure adjuster device has adjusted the compression pressure to the calibrated operating pressure to $P_C$. When the retainer member is oriented in the release position, the axial compression pressure between the stator face and the rotor face is substantially removed from the rotor stator interface. When the retainer member is oriented in the stop position, the axial compression pressure between the stator face and the rotor face is substantially reproduced at the calibrated operating pressure, $P_C$.

In yet another aspect of the present invention, a method of rebuilding a high pressure, multi-position shear valve assembly is provided comprising substantially removing the axial compression pressure at the rotor-stator interface, disassembling the stator element and the rotor element from opposed contact with one another, and replacing one or more serviceable valve components. The method further includes reassembling the rotor element and stator element back into opposed contact with one another, and substantially reproducing the operating pressure, $P_C$, between the rotor element and the stator element at the rotor-stator interface by moving the pressure adjuster assembly to a stop position, hard stopped relative to the valve housing.

In one specific embodiment, substantially removing the axial compression pressure includes moving the pressure adjuster assembly from the stop position to a release position.

In yet another configuration, prior to the substantially removing the axial compression pressure, the method includes selectively generating an axial compression pressure between the stator face and the rotor face at the calibrated operating pressure, $P_C$. This step was performed by orienting a retainer member, disposed between the valve housing and a pressure adjuster device in the stop position, hard stopped relative to the valve housing, and selectively adjusting the pressure adjuster device, cooperatively disposed between the retainer member and the rotor device until the calibrated operating pressure, $P_C$, is achieved at a set position, when the retainer member is oriented in the stop position. Finally, the technique include locking the pressure adjuster device, at the set position, to the retainer member such that the pressure adjuster device and the retainer member move together as a single unit.

BRIEF DESCRIPTION OF THE DRAWINGS

The assembly of the present invention has other objects and features of advantage which will be more readily apparent from the following description of the best mode of carrying out the invention and the appended claims, when taken in conjunction with the accompanying drawings, in which:

FIG. 4 is a bottom perspective view of a micro-fluidic valve assembly constructed in accordance with the present invention.

FIG. 5 is an enlarged, top perspective view of a pressure adjustment assembly of the micro-fluidic valve assembly of FIG. 4, constructed in accordance with the present invention.

FIG. 14 is an enlarged, fragmentary, bottom perspective view of the micro-fluidic valve assembly of FIG. 4, showing the use of an install/removal tool.

FIG. 15 is a partially exploded, bottom perspective view of the micro-fluidic valve assembly of FIG. 4

DETAILED DESCRIPTION OF THE INVENTION

Figure 2:
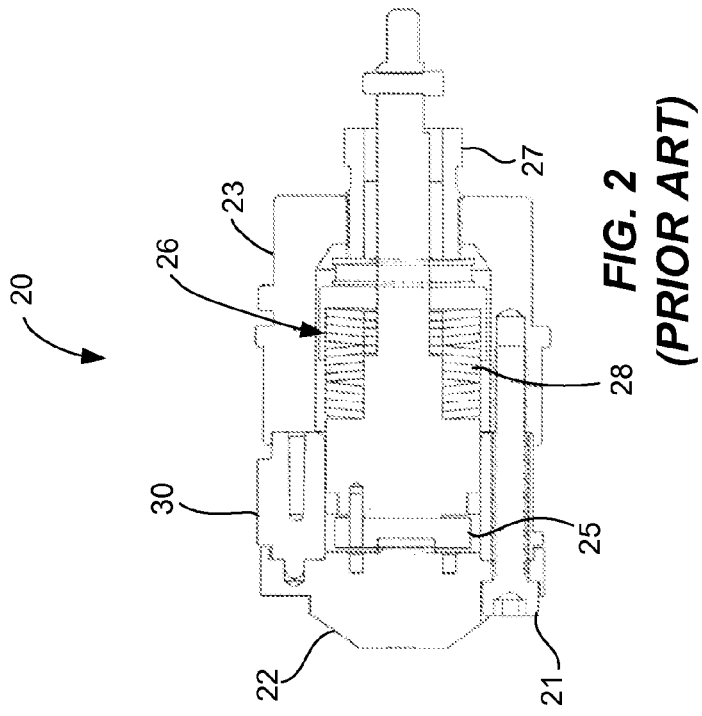
FIG. 2 is a side elevation view, in cross-section, of the micro-fluidic valve assembly of FIG. 1.
Figure 1:
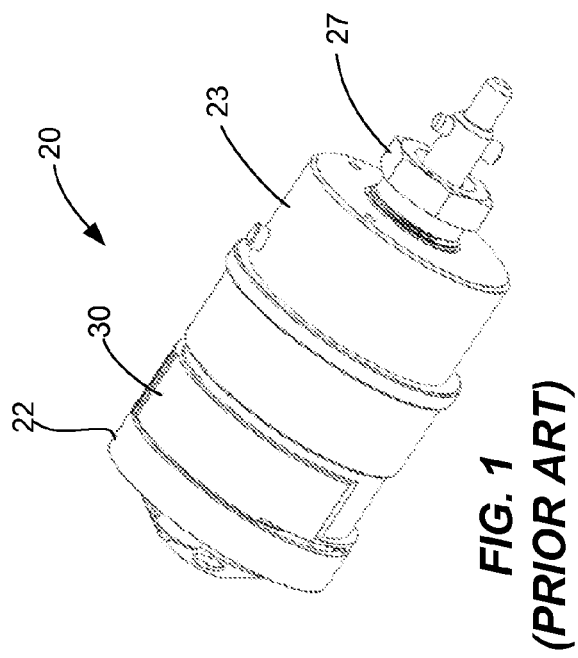
FIG. 1 is a bottom perspective view of a micro-fluidic valve assembly.
Figure 3:
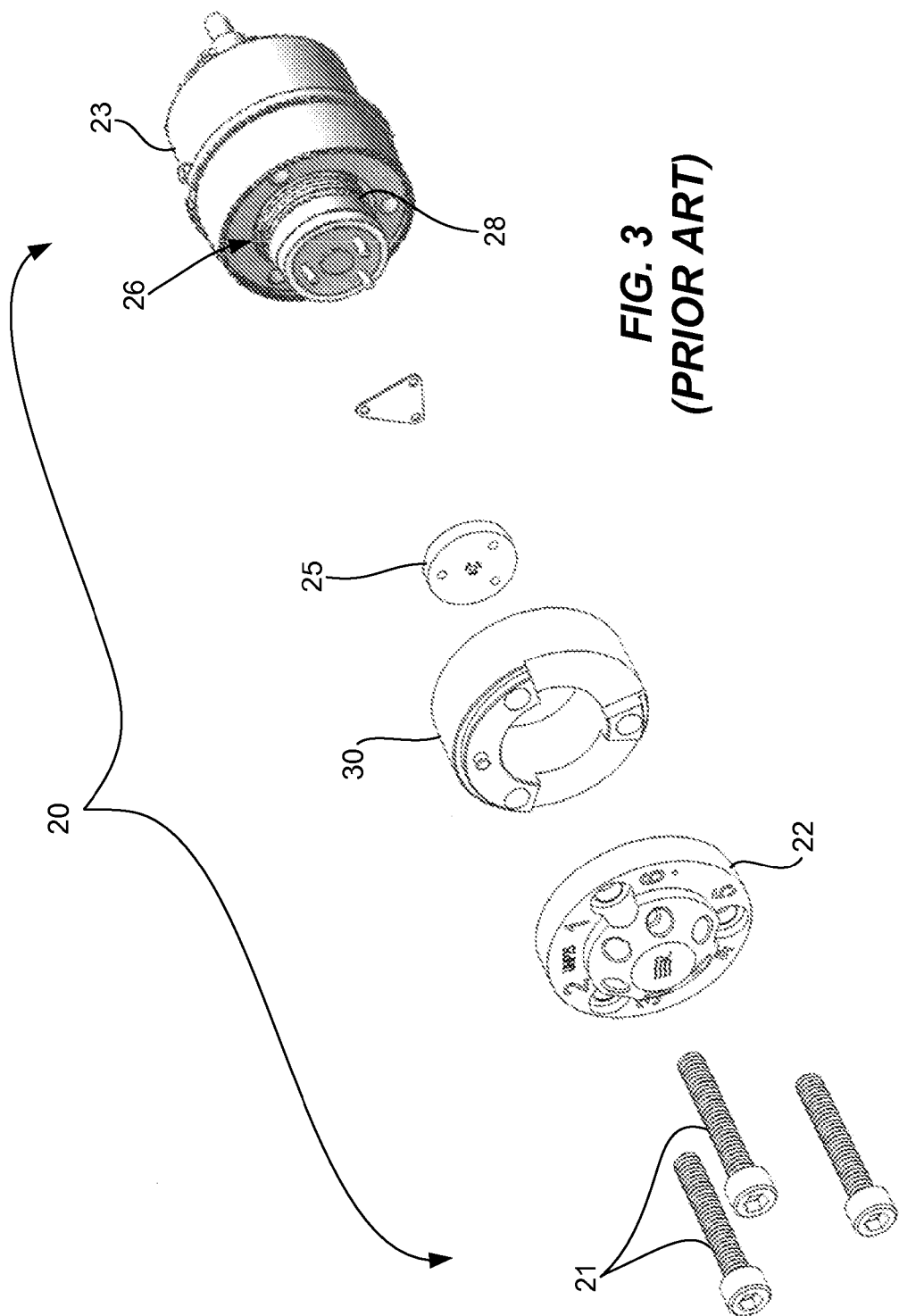
FIG. 3 is a complete exploded top perspective view of the micro-fluidic valve assembly of FIG. 1.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Turning now to FIGS. 4-8 and 10, a high pressure, multi-position valve assembly, generally designated 40, is provided having a valve housing 41, defining a central through-passage 42, a stator element 43 and a rotor element 45. The rotor element 45 is rotatably mounted about a rotational axis 46, and defines a rotor face 47 disposed in opposed contacting relationship to a stator face 48 of the stator element 43, at a rotor-stator interface. The valve assembly 40 further includes a pressure adjustment assembly, generally designated 50, movable between a release position (FIG. 6) and a stop position (FIG. 7), hard stopped relative to the valve housing 41. Briefly, the pressure adjustment assembly 50 includes a pressure adjuster device 51 that is initially movable relative to the remaining portions of the pressure adjustment assembly. The pressure adjuster device is further configured to movably cooperate with at least one of the rotor element 45 and the stator element 43, and the valve housing 41 to adjustably generate an axial compression pressure between the stator face 48 and the rotor face 47 at a calibrated operating pressure, $P_C$. At such calibrated operating pressure, $P_C$, the resulting compressive load generated by the pressure adjuster device 51 is sufficient to form a fluid-tight seal the rotor element and the stator element during operative use. Once the pressure adjuster device 51 has been factory adjusted or "set" to generate the calibrated operating pressure, $P_C$, at the interface, a locking structure 52 (FIG. 10) is engaged which is configured to lock the pressure adjuster device 51 relative to the pressure adjustment assembly 50.

When the pressure adjustment assembly 50 is oriented in the release position, the axial compression pressure between the stator face 48 and the rotor face 47 is substantially removed, enabling disassembly of the valve without any significant load exerted at the rotor-stator interface. In contrast, when the pressure adjustment assembly 50 is oriented in the stop position, the pressure adjusting device, locked via the locking structure 52, reproduces the axial compression pressure between the stator face and the rotor face substantially at the factory "set" or calibrated operating pressure, $P_C$.

In one specific embodiment, as best shown in FIGS. 5 and 9-12, the pressure adjustment assembly 50, movably positioned in the housing central through-passage 42, includes a retainer member 53 disposed between the valve housing 41 and the pressure adjuster device 51. The retainer member 53 cooperates with the valve housing to enable relative axial displacement of the adjustment assembly along the housing through-passage 42 between the release position (FIG. 6) and the stop position (FIG. 7). On the other hand, the pressure adjuster device 51 initially cooperates with the retainer member 53 to enable relative axial displacement of the pressure adjuster device along the retainer member 53. Therefore, when the retainer member 53 is oriented in the stop position, axially hard stopped along the housing through-passage 42, the pressure adjuster device 51, isolated from the valve housing, is still capable of axially displacement relative to the valve housing 41 until the locking structure 52 is engaged. This initial relative movement between the pressure adjuster device 51 and the retainer member 53 permits factory calibration in order to "set" the compression pressure at the rotor-stator interface to the calibrated operating pressure, $P_C$.

In accordance with the present invention, once the pressure adjuster device 51 is factory "set" (e.g., generating a calibrated operating pressure, $P_C$ in the range of about 15 Kpsi to about 25 Kpsi for a Rheodyne Titan HT valve, Model HT725-000, manufactured by IDEX Health & Science), the locking structure 52 is engaged, affixing the pressure adjuster device 51 to the retainer member 53 such that the pressure adjuster device and the retainer member permanently move together as a single unit. The pressure adjustment assembly 50 can then be moved back and forth between the release position, removing the load exerted by the pressure adjuster device 51, and the stop position, repositioning the pressure adjuster device 51 at a substantially identical axial position, relative to the valve housing, such that the factory "set", calibrated operating pressure, $P_C$, can be substantially reproduced.

Accordingly, a precision, high-pressure, multi-position valve assembly is provided that is capable of being easily serviced by field technicians and/or end users. By moving the pressure adjusting assembly, or more specifically, the retaining nut, to the release position, the compressive load generated thereby at the rotor-stator interface is removed prior to valve disassembly and component servicing. Importantly, once serviced, the valve can be reassembled in a manner easily and precisely duplicating the factory "set" specifications with little or no field calibration. Effectively, after the serviceable valve components have been replaced, these high pressure micro-fluidic valve assemblies perform similar to new, factory built valves.

Moreover, this rebuildable valve configuration is particularly suitable for more recent ultra high pressure shear valve designs (operating at 25 Kpsi or greater), such as those already disclosed above in our U.S. Provisional Patent Application S/Ns: 61/225,143; 61/301,516 and 61/328,594. As above-indicated, in these ultra high pressure shear valve designs, metal-on-metal sealing surfaces are applied which significantly improve their durability and lifespan.

It has been observed, however, that due to the nature of the materials being used, an end user rebuild of these type valves is very important. For these metal-on-metal sealing surface designs, moreover, the compression load or pressure necessary to reseal the metal surfaces of the replaced valve components must be as close as possible to production, or new valve standards. Accordingly, the ability of this new valve design to enable replacement of the serviceable valve components free of any compression load at the rotor-stator interface, and the ability to accurately reproduce the factory "set" operating pressure, $P_C$, with minimal or no field calibration is highly desirable.

Figure 13:
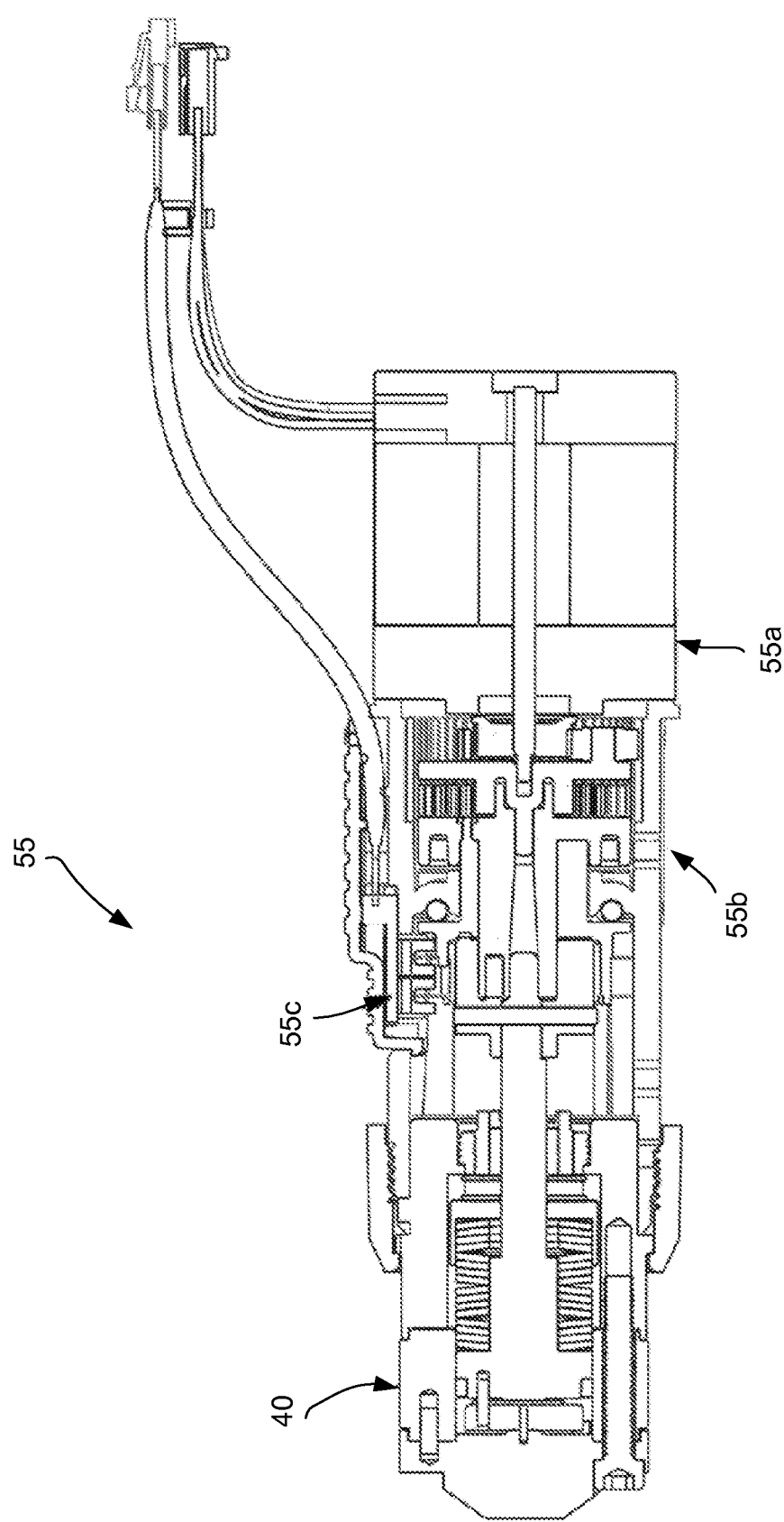
FIG. 13 is a side elevation view, in cross-section, of a micro-fluidic valve system incorporating the micro-fluidic valve assembly of FIG. 4.

Referring now to FIG. 13, these multi-position shear valve assemblies 40 are often deployed as the switching component for complete micro-fluidic valve systems 55 such as those applied in HPLC Instrument platforms and designs. Typical of such complete valve systems 55, which include a drive system 55a, a gear assembly 55b and an encoded controller assembly 55c, is better detailed in our U.S. Pat. No. 7,201,185 to Poppe et al., entitled "COUPLED DRIVE MULTI-POSITION FLUID VALVE APPARATUS AND METHOD"; and/or our U.S. patent application Ser. No. 12/512,925 to Tower, filed Jul. 30, 2009, entitled "MULTI-POSITION MICRO-FLUIDIC VALVE SYSTEM WITH REMOVABLE ENCODER ASSEMBLY", both of which are herein incorporated by reference in their entirety. It will be appreciated, however, that this technology may also be applied to all shear valve assembly platforms/designs (such as AI (analytical chemistry) and IVD (In-vitro Diagnostics)).

The shear valve assembly 40 typically includes a rigid, generally cylindrical-shaped housing 41 having an interior wall 56 that defines the central through-passage 42. This passage extends axially through the housing 41 from a proximal portion to the distal portion thereof. An annular stator ring 57 is disposed at the distal end of the valve housing, defining a stator through-chamber 58 that is in coaxial alignment with the valve housing through-passage 42 when mounted thereto. The stator element is mounted over, and flushly seats against a distal end edge support 59 of the stator ring 57, orienting the stator face 48 at a distal opening into the stator through-chamber 58. Three or more stator screws 60 (in one specific configuration) removably fasten the stator element 43 to the stator ring 57 and the valve housing 41.

The shear valve assembly further includes a rotor assembly 61 rotatably disposed in the housing through-passage 42 for rotation thereof about the rotational axis 46. More particularly, the rotor assembly 61 includes a valve shaft 62 and a distal shaft head portion 63 that is configured to seat the rotor element 45 distally thereon. In one specific embodiment, similar to that disclosed in our U.S. Provisional Patent Application S/Ns: 61/225,143; 61/301,516 and 61/328,594 abovementioned, the head portion includes a raised platform or pad 64 upstanding slightly from a distal surface of the head to promote force concentration and the ability of the rotor element to pivot atop the head portion.

For high pressure applications (i.e., greater than about 18 Kpsi), higher axial compression forces between the rotor face 47 and stator face 48 are necessary to maintain a fluid-tight seal at the interface. In one specific configuration, the required axial compression force (i.e., the calibrated operating pressure, $P_C$) at the rotor/stator interface is in the range of about 3 Kpsi to about 20 Kpsi. To achieve such compression loads and function as the primary force mechanism to seal the rotor face 47 against the stator face 48, the valve assembly 40 includes a spring assembly 65 disposed in the valve housing through-passage 42, annularly around the valve shaft 62. A proximal portion of the spring assembly 65 cooperates with the pressure adjustment assembly 50, while a distal portion thereof contacts the shaft head portion 63, distally biasing rotor face 47 against the stator face 48.

Figure 6:
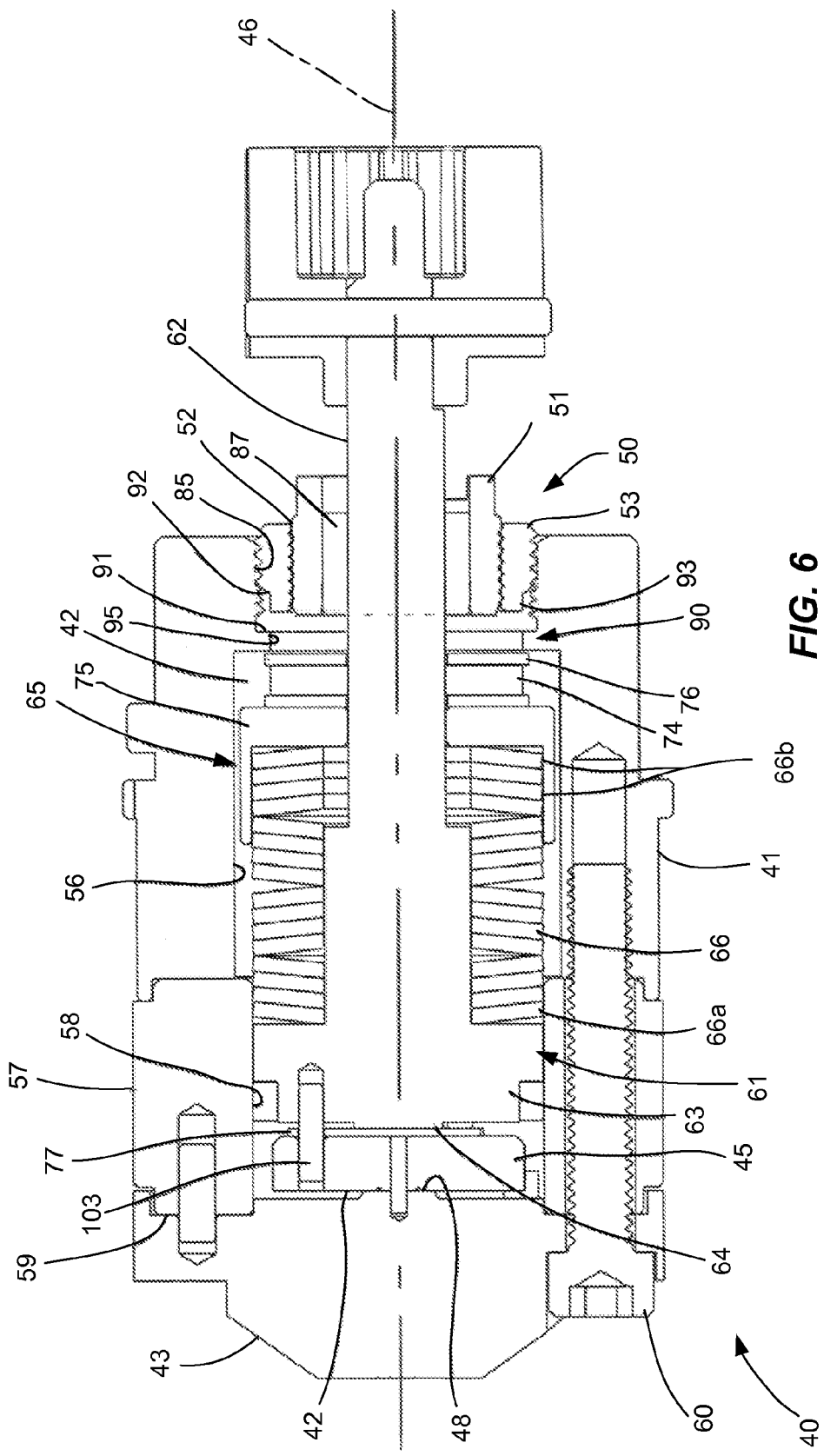
FIG. 6 is an enlarged, side elevation view, in cross-section, of the micro-fluidic valve assembly of FIG. 4, showing the pressure adjustment assembly in a release position.
Figure 7:
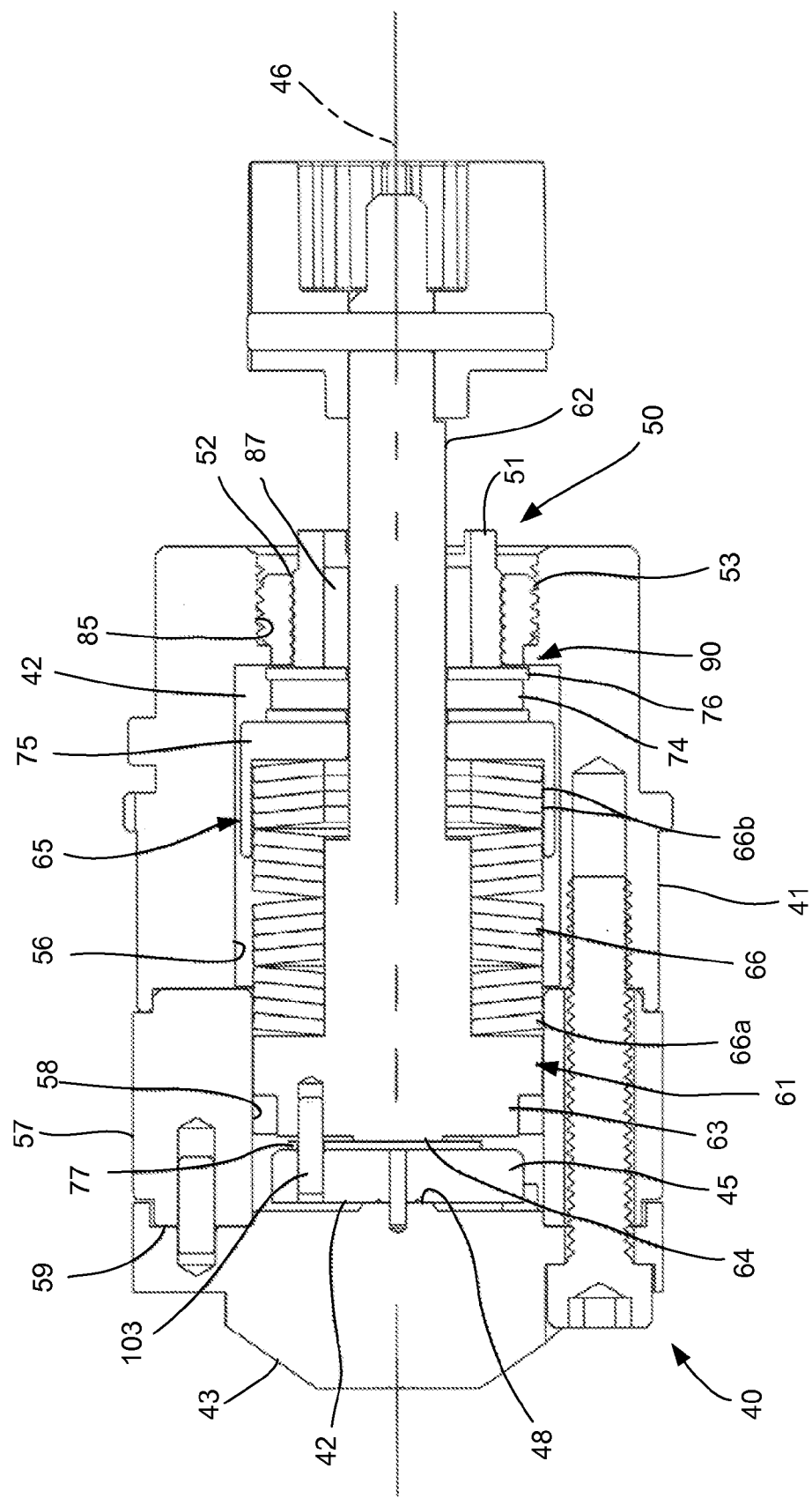
FIG. 7 is an enlarged, side elevation view, in cross-section, of the micro-fluidic valve assembly of FIG. 4, showing the pressure adjustment assembly in a stop position.
Figure 8:
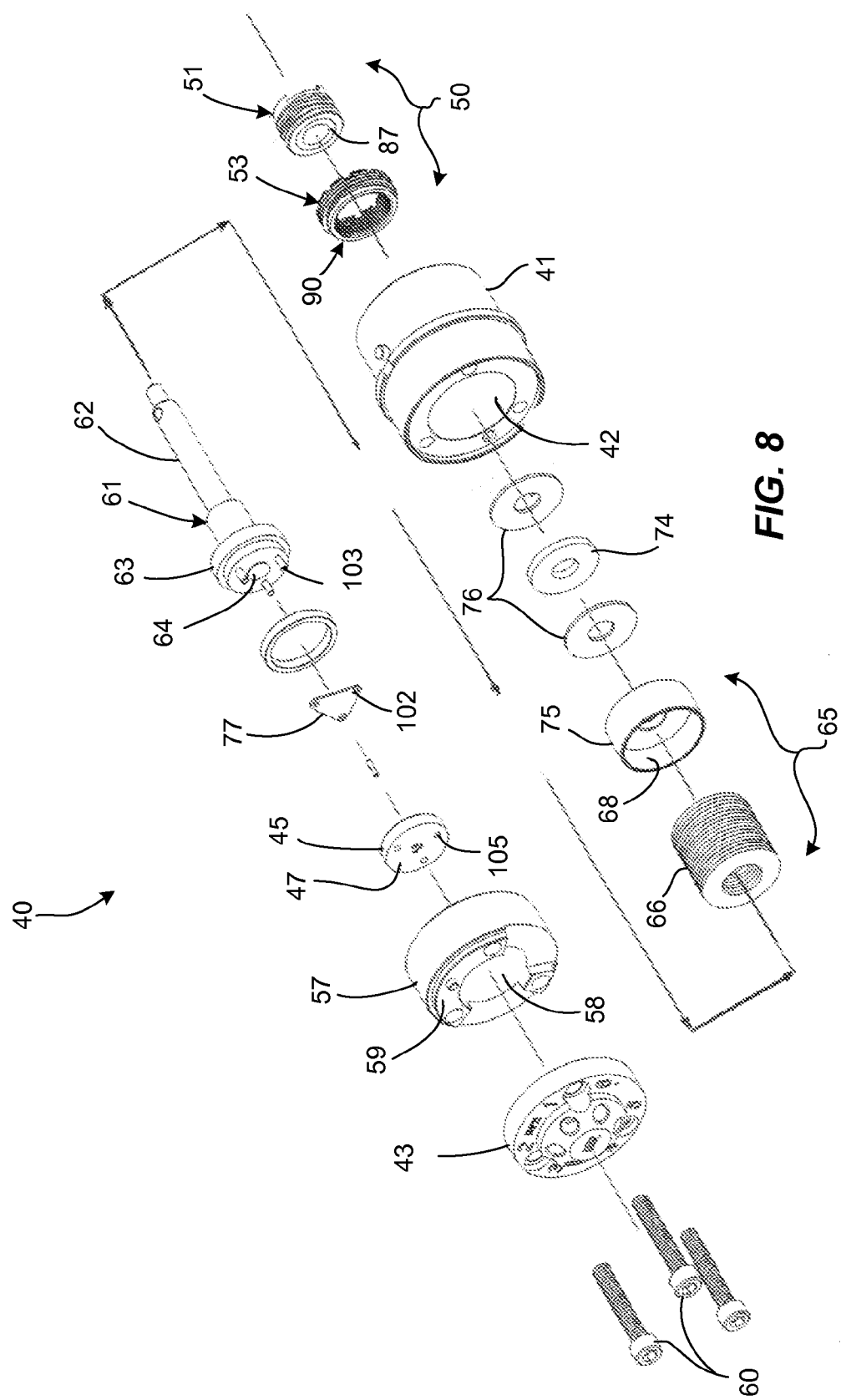
FIG. 8 is a complete exploded top perspective view of the micro-fluidic valve assembly of FIG. 4.
Figure 9:
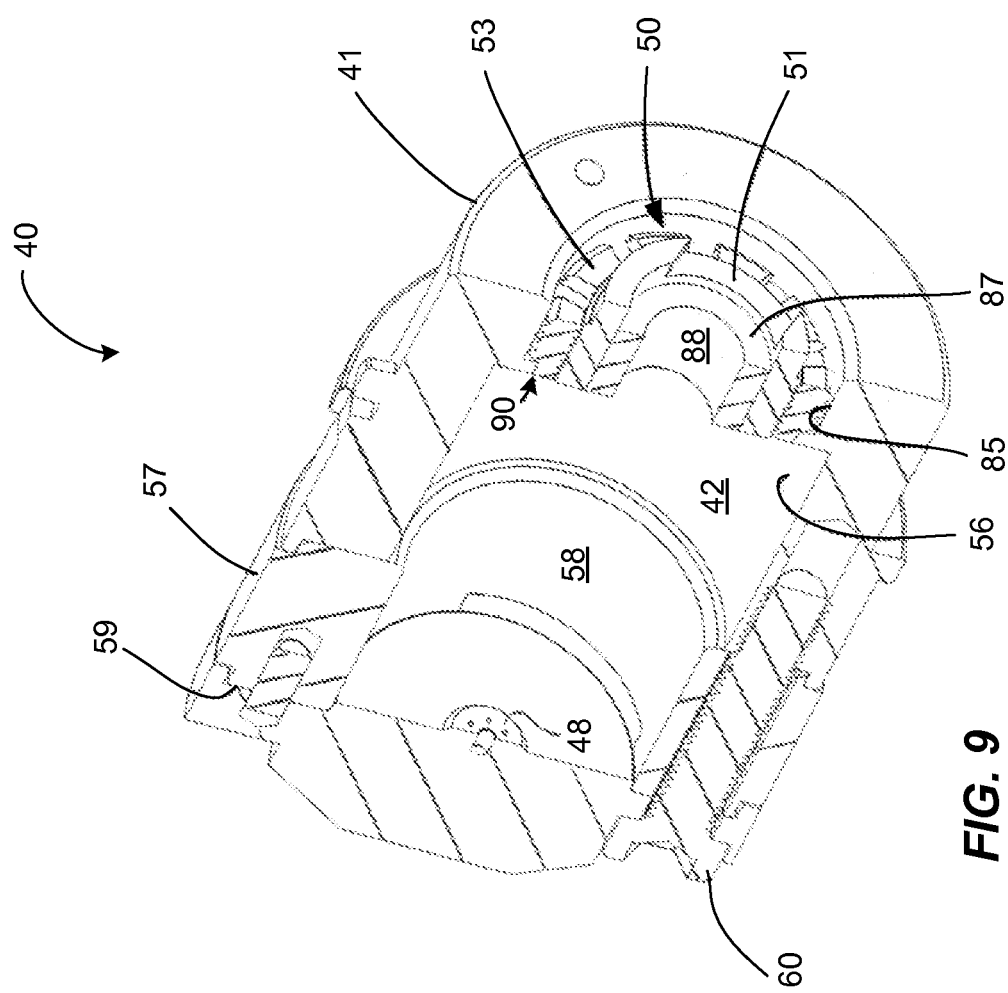
FIG. 9 is an enlarged, bottom perspective view, in cross-section, of a housing and stator element of the micro-fluidic valve assembly of FIG. 4, with the pressure adjustment assembly mounted thereto.
Figure 10:
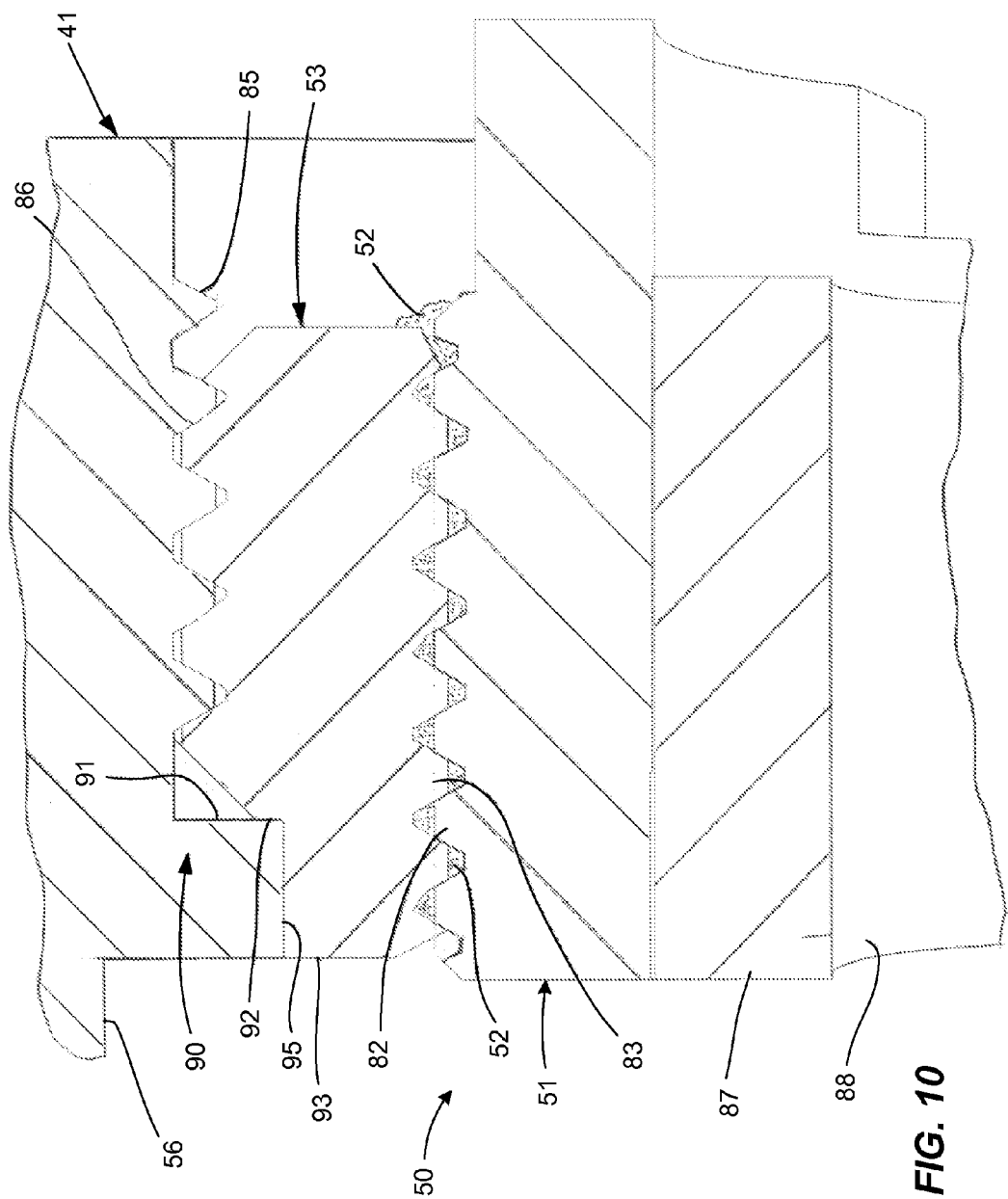
FIG. 10 is an enlarged, fragmentary, side elevation view, in cross-section, of the micro-fluidic valve assembly of FIG. 4, showing the pressure adjustment assembly in a stop position.

FIGS. 6-8 best illustrate that the spring assembly 65 includes a series of spring washers 66 disposed annularly about the valve shaft. The distal most washer 66a is positioned in abutting contact with an annular, proximal facing, end shoulder 67 of the shaft head portion 63, while the proximal portion spring washers 66b are retained in a recess 68 of a spring cup 75. One or more load washers 76 and a thrust bearing 74 are disposed between the proximal end of the spring cup 75 and the pressure adjuster device 51, which function to isolate direct contact of the distal end of the pressure adjuster device 51 and the spring cup 75, and further to transfer the compressive load from the pressure adjuster device to the spring cup. Accordingly, as the pressure adjuster device 51 is axially displaced either distally or proximally during the factory calibration, the compressive forces caused by the spring washers 66, against the shaft head portion, can be adjusted.

Applying conventional calibration techniques, the pressure adjuster nut 51 is factory adjusted until the compression pressure at the interface (i.e., ultimately the calibrated operating pressure, $P_C$) is sufficient to hold a specified fluid pressure within the stator port(s) and rotor seal groove(s), while at the same time achieving a specified leak rate. In one calibration example, when the valve is factory "set" (e.g., when the pressure adjuster device 51 is adjusted until a specified leak rate is achieved, typically this rate is 0.3 uL/min), fluid pressure is applied to the valve through the stator port(s) and rotor seal groove(s). Once the shear valve components are capable of holding the required amount of fluid pressure (e.g., 15-20 Kpsi in this instance, and 25 Kpsi and greater for ultra high pressure applications) at the specified leak rate (e.g., 0.3 uL/min), the valve is factory "set", and the pressure adjusting device 51 is considered oriented at its factory "set position" wherein calibrated operating pressure is at $P_C$.

Briefly, at a very minimum, the calibrated operating pressure, $P_C$, at the specified leak rate is at least equal to rated fluid pressure that the valve can accommodate. It has been observed that designing a "spring stack" that can deliver up to about 150% of the rated fluid pressure of the valve is generally more than sufficient to form a fluid-tight seal at the rotor-stator interface. In other words, the calibrated operating pressure, $P_C$, which cannot be determined until the calibration is performed, is typically at the very least equal to the rated fluid pressure of the valve up to about 150% of the rated fluid pressure.

Accordingly, using the equation Pressure=Force/Area, where the Pressure is selected at $P_{150}$ which is at about 150% of the rated fluid pressure of the valve, and the area is that of the "boss" on the stator element 43, a Force, $F_{150}$, (or load of the spring assembly) necessary to generate $P_{150}$ can be calculated.

Using spring data sheets for potential "spring stacks" of spring washers 66 to be applied, a "load" similar to $F_{150}$, at a known axial spring travel thereof, can be selected. From this, the "spring rate" can be determined, and thus, the proper "spring stack" can be selected. Once this is known, a theoretical amount to tighten the "pressure adjuster" can be calculated to achieve an axial compression pressure, between the stator face and the rotor face, at the very least equal to the rated fluid pressure of the valve up to about 150% of the rated fluid pressure thereof. Subsequently, each valve can be calibrated to determine its own calibrated operating pressure, $P_C$.

During the normal lifecycle of the valve assembly 40, however, certain valve components can be serviced or replaced, extending the usable life of a vast majority of the valve system components. Such serviceable components, for instance, typically include the rotor seal or element 43, the stator element 45 and a shim 77 (as equipped in the next generation metal-on-metal valves). As mentioned above, one of the difficult design hurdles for a high pressure valve applications of this nature is designing one that can be serviced by field technicians or the end user, and yet one that can easily and precisely duplicate the factory "set" specifications with little or no field calibration, enabling performance similar to a new, factory built valves.

In accordance with the present invention, the design features of the pressure adjustment assembly 50, and its cooperation between the valve housing 41 and the spring assembly 65, promote precise repositioning of the pressure adjuster device 51, after any servicing or rebuild, and thus load reproducibility. Referring now to FIGS. 5, 8 and 10-12, the pressure adjustment assembly 50 is shown generally including the retainer member 53, the pressure adjuster device 51 and the locking structure 52. In brief, the retainer member 53 is configured to movably mounted to the valve housing 41 between the released position (FIG. 6) and the stop position (FIG. 7), axially hard stopped within the central through-passage 42 in the distal direction. The pressure adjuster device 51, on the other hand, is initially movably mounted to the retainer member 53 for relative axial displacement within the through-passage. Once the valve assembly 40 is factory calibrated, generating the factory "set", calibrated operating pressure, $P_C$, at the rotor-stator interface, the lock structure is engaged to permanently retain the adjuster device 51 to the retainer member in the "set position".

Figure 12:
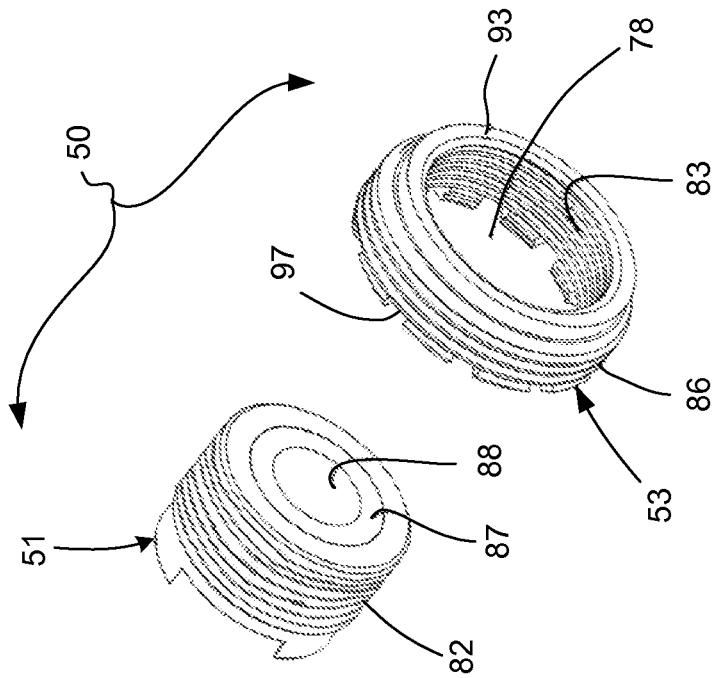
FIG. 12 is an exploded, bottom perspective view of the pressure adjustment assembly of FIG. 5.
Figure 11:
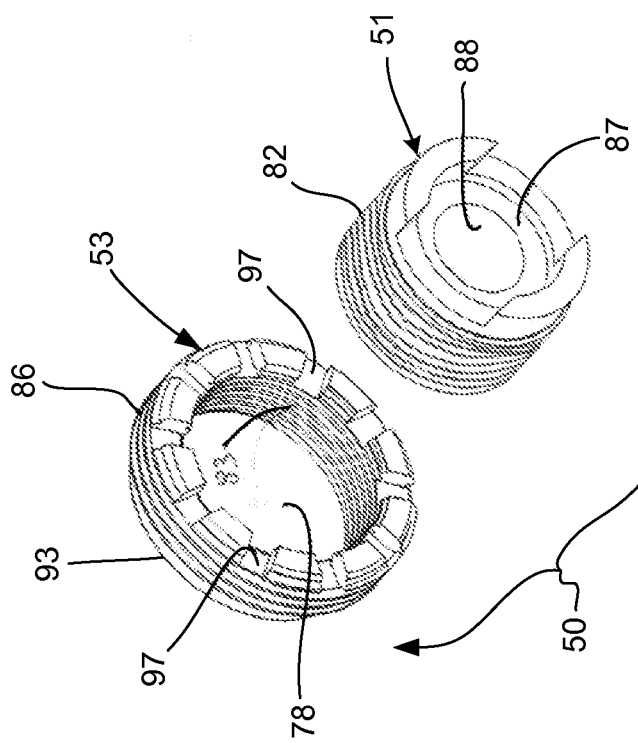
FIG. 11 is an exploded, top perspective view of the pressure adjustment assembly of FIG. 5.

Both the retainer member 53 and the pressure adjuster device 51, as best indicated in FIGS. 11 and 12, are preferably provided by "ring nut" style fasteners. The retainer nut 53 is sized and dimensioned for concentric disposition within the valve housing through-passage 42, while the pressure adjuster nut 51 is sized and dimensioned for concentric disposition within a central through-hole 78 of the retainer nut, both of which are coaxially aligned with the rotational axis 46. The outer facing circumferential surface of the pressure adjuster nut 51 includes a first engaging section 82 that is sized and dimensioned to cooperate with a second engaging section 83 of the retainer nut 53, defined by an inner facing circumferential surface thereof. These two engaging sections 82 and 83 cooperate with one another to enable selective, proximal and distal axial displacement of the pressure adjuster device 51 during the factory pressure adjustment calibration procedure.

Preferably, the first engaging section 82 of the pressure adjuster device 51 and the second engaging section 83 of the retainer member 53 are mutually threaded for threaded engagement therebetween. Thus, by selectively rotating the pressure adjusting ring nut clockwise or counter clockwise, the distal end thereof can be axially displaced, distally or proximally, relative to valve housing through-passage 42, when the retainer member is oriented in the stop position.

In a similar manner, a proximal portion of the valve housing interior wall 56 defines a circumferential, inner facing first engaging wall 85 that is configured to cooperate with a circumferential, outer facing second engaging wall 86 of the retainer nut 53, enabling relative axial displacement thereof between the release position (FIG. 6) and the stop position (FIG. 7). In addition, similarly, the first engaging wall 85 of the valve housing 41 and the second engaging wall 86 of the retainer nut 53 are mutually threaded for threaded engagement therebetween. By selectively rotating the retainer nut clockwise or counter clockwise, the pressure adjustment assembly can be axially displaced, distally or proximally, relative to the central through-passage 42 of the valve housing 41 for movement between the release position and the stop position.

It will be appreciated that while a threaded engagement between the opposed engaging sections 82, 83 and the opposed engaging walls 85, 86 is described in detail, other conventional engaging mechanism that enable relative axial displacement can be incorporated without departing from the true spirit and nature of the present invention. Such alternative engagement mechanisms, for instance, may include a ratchet-style mechanism, an axial slide mechanism, cam lock, etc.

To rotationally isolate the pressure adjustment assembly 50 from the rotating valve shaft 62, a conventional bearing or bushing 87 is disposed within the central bore 88 of the pressure adjuster device 51. These bushings or bearings not only rotationally isolate the valve shaft from contact with the pressure adjuster device 51, but also functions to rotationally support the rotor assembly within the valve housing central through-passage 42.

Turning now to FIGS. 6, 7, 9 and 10, the multi-position shear valve assembly 40 of the present invention includes a stop mechanism 90 to limit relative axial displacement of the retainer member 53, in a distal axial direction, at a precise and reproducible location along the through-passage 42 (i.e., at the stop position). In general, distal portions of the housing first engaging wall 85 and the retainer second engaging wall 86 cooperate to prevent further threaded displacement therebetween, and thus, further relative axial displacement in the distal direction. The stop mechanism 90 preferably includes a proximally facing annular shoulder portion 91 protruding radially inward from a distal portion of the valve housing first engaging wall 85. This shoulder portion 91 is formed and dimensioned to abut against an opposing annular stop wall 92 distally defined by the retainer member 53. Accordingly, as threaded second engaging wall 86 of the retainer member 53 engages the threaded first engaging wall 85 of the valve housing, during movement from the released position (FIG. 6) toward the stop position (FIG. 7), the retainer stop wall 92 abuts and contacts the opposed shoulder portion 91 of the valve housing, preventing further axial or rotational displacement, distally along the housing through-passage 42, in the stop position. This engagement provides a hard stop for the retainer member 53 axially along the through-passage 42 that is precise and easy to reproduce for any service technician and/or end user rebuild.

A nippled end portion 93 of the retainer member 53 is formed for snug sliding receipt within a narrowed receiving port 95 of the valve housing through-passage, generally separating the chamber accommodating the pressure adjustment assembly 50 from the chamber accommodating the spring assembly 65. As the retainer member nears the stop position, the nippled end portion 93 is rotatably and slideably received in the receiving port 95, further facilitating alignment and centering of the components when the pressure adjustment assembly 50 is oriented completely at the stop position.

During installation and/or removal of the pressure adjustment assembly 50 toward and from the stop position, a special install/removal tool 96 (FIGS. 14 and 15) has been developed, and is applied, to engage the retainer nut 53. As best viewed in FIGS. 5, 11 and 13, an annular proximal end of the retainer member 53 is keyed, having a plurality of notches or recesses 97 circumferentially spaced thereabout. These spaced recesses 97, preferably paired on opposed sides of the retainer proximal end, are formed to receive a pair of similarly sized and spaced tab members 98 on the install/removal tool 96. When the opposed tool tab members 98 are properly inserted distally into a selected pair of recesses 97, a simple clockwise or counterclockwise turn of the tool handle portion 100 enables a technician to easily turn the retainer member 53, and thus the pressure adjuster device 51 (i.e., the pressure adjustment assembly 50), together as a unit.

The install/removal tool 96 includes a circular cutout portion 101 between the two spaced tab members 98. This cutout portion 101 is formed for axial of the valve shaft 62 therein when the tab members 98 are placed into opposed recesses 97. This design enables operation of the install/removal tool without any contact or interference with either the pressure adjuster device 51 or the valve shaft 62.

In accordance with the present invention, with the retainer member in the stop position, once the pressure adjuster device 51 is factory adjusted so that the spring assembly 65 generates the calibrated operating pressure, $P_C$, at the rotor-stator interface (i.e., at its "set" position), the locking structure 52 may be engaged, rigidly locking the pressure adjusting nut to the retainer nut so that two now function together as a single unit. In one specific embodiment, the locking structure 52 may be provided by mechanical means, such as a "double-nut" type design (not shown), that threadably fastens or locks the pressure adjuster device 51 to the retainer member 53. Other mechanical locking devices that can be employed can range from significantly more sophisticated locking mechanisms to those as simplistic as welding or soldering of the components rigidly together.

The preferred embodiment for the locking structure 52, however, includes the application of a retaining compound or adhesive, or the like, that can be applied between the engaging threads of the first and second engaging sections 82, 83. One particularly suitable retaining compound is thread lockers (E.g., LOCTITE®) or other thread sealer that can be easily applied to the assembly at a proximal end interface between the retainer nut 53 and the pressure adjuster nut 51, where it can easily infiltrate, via gravity, capillary action or injection between the threads. In the non-cured state of LOCTITE®, the viscosity of this liquid adhesive is sufficient to enable flow between the opposing threads of the engaging sections without disturbing the axial or rotational relationship between the pressure adjuster nut 51 and the retainer nut 53. Once the retaining compound cures, the pressure adjuster device 51, for the purpose of the present invention, will more or less be permanently fastened to the retainer member 53, in the "set position".

Other suitable retaining compounds include cold welds, such as JB Weld, as well as the application of acrylics, epoxies, hot melts.

In another aspect of the present invention, a valve assembly and rebuilding procedure is provided for multi-position shear valve assemblies that simplify the rebuild process for field technicians and/or end users. During the initial assembly of the shear valve assembly 40 of the present invention, the retainer nut 53 is threadably engaged into the housing through-passage 42 from a proximal opening thereto. As the retainer second engaging wall 86 threadably engages that of the housing first engaging wall 85, the retainer member is axially displaced from the release position until fully parked at the stop position, hard stopped against the stop mechanism annular shoulder portion 91.

The pressure adjuster device 51 is then threaded into the through-hole 78 of the retainer member 53 from a proximal end thereof. The threaded engagement between the second engaging section 83 of the pressure adjusting device with the first engaging section 82 of the retainer member continues until the distal end edge of the pressure adjuster device 51 is generally flush with the distal end edge of the nippled end portion 93 of the retainer member 53. Subsequently, the primary valve components are conventionally assembled which includes assembly and installation of the rotor assembly 61, spring assembly 65, stator ring and stator element within and/or to the valve housing 41.

Applying conventional calibration techniques, the pressure adjuster nut 51 is factory adjusted until the compression pressure at the interface is sufficient to hold a specified high fluid pressure within the stator ports and rotor seal grooves, while at the same time achieving a specified rate of pressure decay. Once the shear valve components are capable of holding the required amount of fluid pressure (e.g., about 25 Kpsi or higher for Ultra high fluid delivery) at the specified leak rate (e.g., 0.3 uL/min), the valve is factory "set", and the pressure adjuster device 51 is considered oriented at its factory "set position".

At this "set position", accordingly, the locking structure 52 is engaged, locking the pressure adjuster device 51 to the retainer member, and thus, its "set position". In one specific example, as mentioned, the locking structure 52 is provided by a retaining compound, such as thread locker LOCTITE®, flowed between the engaging threads. Once the retaining compound cures, the pressure adjuster device 51 will be physically locked to the retainer member 53 such that the two function together as a single unit.

After thousand of cycles of repetitious normal use, many high pressure multi-position shear valve assemblies of this nature may be serviced and rebuilt rather than replaced, as mentioned above. In accordance with the present invention, the retainer nut 53 is loosened from the stop position (FIG. 7), using the install/removal tool, by placing the two spaced tab members 98 in any pair of accessible recesses 97 on the proximal end of the retainer nut.

Rotation of the retainer nut 53 continues, in the counter-clockwise direction, until the pressure adjusting ring nut 51 is "backed-off" of contact with the load washers 66, thus, removing any load placed upon the rotor assembly 61, and hence, the rotor stator interface, prior to valve disassembly. Once the retainer nut 53 is fully oriented at the release position (FIG. 6), any influence exerted upon the rotor assembly 61 by the pressure adjustment assembly should be removed, enabling the valve shaft to move axially within the central through-passage 42.

At this point, the socket head cap screws 60 may be removed with hex key wrench, enabling removal of the stator element 43 from the stator ring 57. The remaining serviceable valve components may also be removed, including the rotor element 45, and any underlying shim, if so equipped. In some instances, the stator ring 57 may require removal in order to gain more access to the rotor element for removal thereof.

As best illustrated in FIGS. 8 and 14, the shim 77 is initially replaced, if equipped, by aligning the three though-holes 102 with the three rotor assembly alignment pins 103, and sliding the shim down to the distal base of the shaft head portion 63. The rotor element 45 is similarly aligned, placing the alignment pins 103 through the alignment holes 105 of the rotor element. During this installation, it important that the back or proximal face of the rotor element 45 seat flush against the shim or distal face of the shaft head portion 63.

If stator ring 57 was removed, then at this juncture, it will be reinstalled by placing ring over shaft head portion 63. To properly align the stator ring 57 relative to the valve housing, a pin protruding from the proximal end of the stator ring 57 is aligned with, and received in, an alignment slot formed in distal face of the valve housing 41.

When installing or reinstalling a new, or existing, stator element 43 onto the distal end of the stator ring 57, an alignment hole, on the proximal face of the stator element 43, is aligned with, and receives, a stator ring alignment pin, for proper orientation of the stator ports relative to the rotor grooves. At this point, with the pressure adjustment assembly in the release position, wherein the load is removed, the stator element 43 can be installed flush against the distal end edge support 59 of the stator ring 57. This feature is important to ensure perpendicularity of the stator face 48 to the stator ring 57, and thus facilitating flush sealing against the rotor face. Subsequently, the stator screws 60 are reinserted, and evenly threaded into the valve housing, making sure to not tighten one side more than the others, free of any resistance due the lack of a compression load.

Once stator screws are secured, and the stator element is properly installed, the retaining ring nut can be moved back, via the special install/removal tool, from the release position (FIG. 6) to the stop position (FIG. 7). In this manner, the special tool 96 continually tightens or rotates the retainer nut 53 clockwise, until the stop wall 92 of the retainer abuts the opposed shoulder portion 91 of the valve housing, hard stopping the entire adjustment assembly in the stop position. In accordance with the present invention, assuming the tolerances of the new stator element and/or rotor element are substantially similar to those of the valve component(s) removed, the operating pressure, $P_C$, at the interface of the sealing surfaces will be the substantially similar in the rebuilt valve as when built in production.

Although the present invention has been described in connection with the preferred form of practicing it and modifications thereto, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

What is claimed is:

1. A rebuildable multi-position valve assembly factory pre-adjusted to operate at a calibrated operating pressure $P_C$, comprising:
    a valve housing;
    a stator element defining a stator face;
    a rotor element rotatably mounted about a rotational axis, said rotor element defining a rotor face disposed opposite said stator face, at a rotor-stator interface; and
    a pre-adjusted pressure adjustment assembly movable between a release position and a hard stop position, hard stopped relative to said valve housing and biasing said valve assembly to operate substantially at said calibrated operating pressure, $P_C$, said pressure adjustment assembly including:
        a pressure adjuster device;
        a retainer member movably disposed between said valve housing and said pressure adjuster device for movement of the pressure adjustment assembly between the release position and the hard stop position, said pressure adjuster device configured to movably cooperate between at least one of the rotor element and the stator element, and the retainer member, in the hard stop position to adjustably generate an axial compression pressure between the stator face and the rotor face at said calibrated operating pressure, $P_C$, to enable fluid-tight, selective relative rotation between the rotor face and the stator face between two or more rotor positions when said pressure adjustment assembly is oriented in the hard stop position; and
        a lock structure configured to lock the pressure adjuster device relative to the retainer member, when the pressure adjuster device is oriented in a factory adjusted set position at said calibrated operating pressure, $P_C$, such that said pressure adjuster device and said retainer member move together as a single unit,
    wherein, when said pressure adjustment assembly is oriented in said release position, the axial compression pressure between said stator face and said rotor face is substantially removed from said rotor-stator interface, and
    wherein, when said pressure adjustment assembly is oriented in said hard stop position, the axial compression pressure between said stator face and said rotor face is substantially reproduced at said calibrated operating pressure, $P_C$.

2. The valve assembly according to claim 1, wherein said lock structure includes a fastener configured to mechanically fasten the pressure adjuster device to the retainer member.

3. The valve assembly according to claim 1, wherein said lock structure includes a retaining compound configured to join the pressure adjuster device to the retainer member.

4. The valve assembly according to claim 3, wherein said retaining compound is selected from the group consisting of thread lockers, acrylics, epoxies, hot melts, solders and cold welds.

5. The valve assembly according to claim 1, wherein said valve housing defines a through passage extending axially therethrough, a portion of said through passage being defined by a first engaging wall; said retainer member includes a second engaging wall sized and dimensioned to cooperate with said first engaging wall for axial displacement between the release position and the hard stop position.

6. The valve assembly according to claim 5, wherein said first engaging wall and said second engaging wall are configured for threaded engagement therebetween.

7. The valve assembly according to claim 5, further including:
    a stop mechanism configured to limit relative axial displacement of the retainer member, in a distal axial direction, when oriented in the hard stop position.

8. The valve assembly according to claim 7, wherein said stop mechanism includes an annular shoulder portion extending radially inwardly from said first engaging wall.

9. The valve assembly according to claim 7, wherein said retainer member including a stop surface configured to abut said shoulder portion of said first engaging wall in the hard stop position.

10. The valve assembly according to claim 5, wherein said pressure adjuster device includes a first engaging section sized and dimensioned to cooperate with a second engaging section of the retainer member for relative axial displacement therebetween.

11. The valve assembly according to claim 10, wherein said first engaging wall and said second engaging wall are configured for threaded engagement therebetween, and said first engaging section and said second engaging section are configured for threaded engagement therebetween.

12. The valve assembly according to claim 11, wherein said pressure adjuster device is concentrically disposed within said retainer member.

13. The valve assembly according to claim 12, wherein said first engaging section is disposed on an outer circumferential surface of said pressure adjuster device, and said second engaging section is disposed on an inner circumferential surface of said retainer member such that said pressure adjuster device is dispose concentrically within said retainer member.

14. The valve assembly according to claim 11, wherein said lock structure includes a retaining compound to join the pressure adjuster device to the retainer member.

15. The valve assembly according to claim 14, wherein said retaining compound is selected from the group consisting of thread lockers, acrylics, epoxies, hot melts, solders and cold welds.

16. The valve assembly according to claim 5, further including:
a rotor assembly including a valve shaft, rotatably disposed in the housing through passage for rotation about said rotational axis, and a distal shaft head portion defining said rotor element at a distal end of said valve shaft, and
a spring assembly having a distal portion cooperating with said shaft head portion, and a proximal portion cooperating with said pressure adjuster device.

17. The valve assembly according to claim 16, wherein said pressure adjuster device includes a first engaging section sized and dimensioned to cooperate with a second engaging section of the retainer member for relative axial displacement therebetween, enabling engaging contact of the pressure adjuster device with the proximal portion of said spring assembly.

18. The valve assembly according to claim 17, wherein said first engaging wall and said second engaging wall are configured for threaded engagement therebetween, and said first engaging section and said second engaging section are configured for threaded engagement therebetween.

19. The valve assembly according to claim 18, wherein said pressure adjuster device is concentrically disposed within said retainer member.

20. The valve assembly according to claim 19, wherein said first engaging section is disposed on an outer circumferential surface of said pressure adjuster device, and said second engaging section is disposed on an inner circumferential surface of said retainer member such that said pressure adjuster device is dispose concentrically within said retainer member.

21. The valve assembly according to claim 20, wherein an annular proximal end of said retainer member defines a plurality of paired recesses that enable engagement with an install/removal tool.

22. The valve assembly according to claim 1, further including:
a stop mechanism configured to limit relative axial displacement of the pressure adjuster assembly, in a distal axial direction, when oriented in the hard stop position.

23. The valve assembly according to claim 1, wherein said rotor face of said rotor element and said stator face of said stator element are composed of a metallic material.

24. The valve assembly according to claim 1, wherein said rotor face of said rotor element and said stator face of said stator element are composed of one of a metallic material and a polymer material.

25. A pressure adjustment assembly for a high pressure, multi-position valve assembly having a valve housing defining a through-passage axially extending therethrough, a stator element defining a stator face and a rotor element rotatably mounted about a rotational axis, said rotor element defining a rotor face disposed opposite said stator face, at a rotor-stator interface, said pressure adjustment assembly comprising:
a retainer member disposed in the housing through-passage, and movably mounted to said valve housing between a release position and a hard stop position, hard stopped axially along said through passage;
a pressure adjuster device configured to cooperate with said rotor element and the retainer member, when oriented in the hard stop position, to adjustably generate an axial compression pressure between the stator face and the rotor face at a calibrated operating pressure, $P_C$, to enable fluid-tight, selective relative rotation between the rotor face and the stator face between two or more rotor positions; and
a lock structure, configured to lock the pressure adjuster device relative to the retainer member, when the pressure adjuster device has adjusted the compression pressure to the calibrated operating pressure to $P_C$, and when the retainer member is in the hard stop position,
wherein, when said retainer member is oriented in said release position, the axial compression pressure between said stator face and said rotor face is substantially removed from the rotor stator interface, and
wherein, when said retainer member is oriented in said hard stop position, the axial compression pressure between said stator face and said rotor face is substantially reproduced at said calibrated operating pressure, $P_C$.

26. The valve assembly according to claim 25, wherein said lock structure includes a fastener configured to mechanically fasten the pressure adjuster device to the retainer member.

27. The pressure adjustment assembly according to claim 25, wherein
said lock structure includes a retaining compound configured to join the pressure adjuster device to the retainer member.

28. The pressure adjustment assembly according to claim 27, wherein
said retaining compound is selected from the group consisting of thread lockers, acrylics, epoxies, hot melts, solders and cold welds.

29. The pressure adjustment assembly according to claim 25, wherein
said retainer member includes a second engaging wall sized and dimensioned to cooperate with a first engaging wall, defining a portion of the valve housing through-passage, for axial displacement of the retainer member between the release position and the hard stop position.

30. The pressure adjustment assembly according to claim 29, wherein
said second engaging wall is configured for threaded engagement with the valve housing first engaging wall.

31. The pressure adjustment assembly according to claim 25, further including:
a stop mechanism configured to limit relative axial displacement of the retainer member, in a distal axial direction along the valve housing through-passage, when oriented in the hard stop position.

32. The pressure adjustment assembly according to claim 31, wherein
said stop mechanism includes a stop surface portion of said second engaging wall, configured to abut a portion of the valve housing first engaging wall, in the hard stop position.

33. The pressure adjustment assembly according to claim 29, wherein
said pressure adjuster device includes a first engaging section sized and dimensioned to cooperate with a second engaging section of the retainer member for relative axial displacement therebetween.

34. The pressure adjustment assembly according to claim 33, wherein
said second engaging wall is configured for threaded engagement with the valve housing first engaging wall, and said first engaging section and said second engaging section are configured for threaded engagement therebetween.

35. The pressure adjustment assembly according to claim 34, wherein
said pressure adjuster device is concentrically disposed within said retainer member.

36. The pressure adjustment assembly according to claim 35, wherein
said first engaging section is disposed on an outer circumferential surface of said pressure adjuster device, and said second engaging section is disposed on an inner circumferential surface of said retainer member such that said pressure adjuster device is dispose concentrically within said retainer member.

37. The pressure adjustment assembly according to claim 36, wherein
an annular proximal end of said retainer member defines a plurality of paired recesses that enable engagement with an install/removal tool.

* * * * *